United States Patent
Chavis et al.

(10) Patent No.: US 11,401,938 B2
(45) Date of Patent: Aug. 2, 2022

(54) MOTOR DRIVE SYSTEM AND METHOD

(71) Applicant: Franklin Electric Co., Inc., Fort Wayne, IN (US)

(72) Inventors: Adrian Russell Chavis, Fort Wayne, IN (US); Steven W. Aikman, Fort Wayne, IN (US); Robert L. Wetekamp, Fort Wayne, IN (US); Douglas C. Lynn, Fort Wayne, IN (US)

(73) Assignee: Franklin Electric Co., Inc., Fort Wayne, IN (US)

( * ) Notice: Subject to any disclaimer, the term of this patent is extended or adjusted under 35 U.S.C. 154(b) by 794 days.

(21) Appl. No.: 16/092,390

(22) PCT Filed: Apr. 7, 2017

(86) PCT No.: PCT/US2017/026720
§ 371 (c)(1),
(2) Date: Oct. 9, 2018

(87) PCT Pub. No.: WO2017/180484
PCT Pub. Date: Oct. 19, 2017

(65) Prior Publication Data
US 2021/0396234 A1  Dec. 23, 2021

Related U.S. Application Data (60) Provisional application No. 62/429,862, filed on Dec. 4, 2016, provisional application No. 62/349,081, filed
(Continued)

(51) Int. Cl.
*F04D 15/00* (2006.01)
*F04D 13/10* (2006.01)
(Continued)

(52) U.S. Cl.
CPC .......... *F04D 15/0066* (2013.01); *F04B 17/03* (2013.01); *F04B 47/06* (2013.01);
(Continued)

(58) Field of Classification Search
CPC .. F04D 15/0066; F04D 13/08; F04D 15/0088; F04D 15/0209; F04D 27/0261;
(Continued)

(56) References Cited

U.S. PATENT DOCUMENTS 4,179,244 A     12/1979  Marple
5,000,052 A  *  3/1991   Sipin ................... G01N 1/2202
                                                    73/863.03
(Continued)

OTHER PUBLICATIONS

International Preliminary Report on Patentability received for PCT Patent Application No. PCT/US2017/026720, dated Oct. 25, 2018, 11 pages.
(Continued)

*Primary Examiner* — Peter J Bertheaud
(74) *Attorney, Agent, or Firm* — Faegre Drinker Biddle & Reath LLP (57) ABSTRACT

A motor drive and method to control a motor in a fluid system. The method may comprise determining a pressure; determining a proportional error as a limited difference between the pressure and a pressure setpoint; determining an integral step as a limited proportional error; determining an integral error as a limited sum of the integral step and a preceding unbound integral error; determining an error as the product of the integral error, the proportional error, and a gain factor; and generating a control signal to cause the inverter to output a motor voltage to drive the motor and maintain the pressure about the pressure setpoint.

20 Claims, 10 Drawing Sheets

Related U.S. Application Data on Jun. 12, 2016, provisional application No. 62/320,609, filed on Apr. 10, 2016.

(51) Int. Cl.

| | | |
|---|---|---|
| *F04D 15/02* | (2006.01) | |
| *F04D 27/02* | (2006.01) | |
| *F04B 49/06* | (2006.01) | |
| *F04D 13/08* | (2006.01) | |
| *F04B 49/08* | (2006.01) | |
| *F04B 17/03* | (2006.01) | |
| *F04B 49/10* | (2006.01) | |
| *F04B 47/06* | (2006.01) | |

(52) U.S. Cl.
CPC ............ *F04B 49/06* (2013.01); *F04B 49/065* (2013.01); *F04B 49/08* (2013.01); *F04B 49/10* (2013.01); *F04D 13/08* (2013.01); *F04D 13/10* (2013.01); *F04D 15/0088* (2013.01); *F04D 15/0209* (2013.01); *F04D 27/0261* (2013.01); *F04B 2203/0209* (2013.01); *F04B 2205/04* (2013.01); *F04B 2205/05* (2013.01)

(58) Field of Classification Search
CPC ........ F04D 15/02; F04B 49/065; F04B 49/06; F04B 2205/05; F04B 17/03; F04B 49/10; F04B 49/08; F04B 47/06; F04B 2203/0209; F04B 47/00

See application file for complete search history.

(56) References Cited

U.S. PATENT DOCUMENTS

| | | | | |
|---|---|---|---|---|
| 5,580,221 | A * | 12/1996 | Triezenberg | ....... G05D 16/2066 |
| | | | | 417/12 |
| 6,056,008 | A | 5/2000 | Adams et al. | |
| 6,192,306 | B1 | 2/2001 | Kidokoro et al. | |
| 7,572,108 | B2 * | 8/2009 | Koehl | ..................... F04B 49/06 |
| | | | | 417/44.11 |
| 7,668,694 | B2 * | 2/2010 | Anderson | ................ G05D 9/12 |
| | | | | 702/182 |
| 8,564,233 | B2 * | 10/2013 | Kidd | ...................... H02P 25/04 |
| | | | | 318/632 |
| 9,556,874 | B2 * | 1/2017 | Kidd | ....................... F04B 17/03 |
| 9,590,537 | B2 * | 3/2017 | Pasche | ................... F04B 49/10 |
| 2006/0036336 | A1 | 2/2006 | Chandhoke | |
| 2014/0195804 | A1 | 7/2014 | Hursti | |

OTHER PUBLICATIONS

International Search Report dated Jun. 20, 2017 in International Application No. PCT/US2017/026720.

* cited by examiner

| PRESSURE | P | Is | I | PI | Error | Speed |
|---|---|---|---|---|---|---|
| 70 | 4 | 0.9 | 0.9 | 4.9 | 9.8 | 40.2 |
| 68 | 4 | 0.9 | 1.8 | 5.8 | 11.6 | 38.4 |
| 66 | 4 | 0.9 | 2.7 | 6.7 | 13.4 | 36.6 |
| 64 | 4 | 0.9 | 3.6 | 7.6 | 15.2 | 34.8 |
| 63 | 4 | 0.9 | 4.0 | 8.0 | 16.0 | 34.0 |
| 59 | 0 | 0 | 4.0 | 4.0 | 8.0 | 42.0 |
| 58 | -1 | -0.9 | 3.1 | 2.1 | 4.2 | 45.8 |
| 57 | -2 | -0.9 | 2.2 | 0.2 | 0.4 | 49.6 |
| 56 | -3 | -0.9 | 1.3 | -1.7 | -3.4 | 53.4 |
| 55 | -4 | -0.9 | 0.4 | -3.6 | -7.2 | 57.2 |
| 54 | -4 | -0.9 | -0.5 | -4.5 | -9.0 | 59.0 |
| 53 | -4 | -0.9 | -1.4 | -5.4 | -10.8 | 60.8 |
| 52 | -4 | -0.9 | -2.3 | -6.3 | -12.6 | 62.6 |
| 51 | -4 | -0.9 | -3.2 | -7.2 | -14.4 | 64.4 |
| 50 | -4 | -0.9 | -4.0 | -8.0 | -16.0 | 66.0 |

MOTOR DRIVE SYSTEM AND METHOD

CROSS-REFERENCE TO RELATED APPLICATIONS

The present application is a § 371 National phase entry of International Application No. PCT/US2017/026720, titled MOTOR DRIVE SYSTEM AND METHOD, filed on Apr. 7, 2017, which claims the benefit of U.S. Provisional Patent Applications Nos. 62/320,609, filed on Apr. 10, 2016, 62/349,081, filed on Jun. 12, 2016, and 62/429,862, filed on Dec. 4, 2016, all of which are incorporated herein in their entirety by reference.

FIELD OF THE DISCLOSURE

The disclosure relates generally to a system and a method for driving a motor. More particularly, the disclosure relates to a system and method for adaptively controlling an operating characteristic of the motor in a fluid system.

BACKGROUND

Fluid systems use motors to drive pumps and transfer fluids from supply reservoirs such as wells. A sensor measures a characteristic of the fluid, and a motor drive controls the motor to maintain the characteristic near its setpoint. In some systems, the motor drive measures pressure in a fluid circuit and controls the speed of the motor to maintain the pressure near its setpoint.

The pump must operate against the well head. Wells can be deep or shallow, and the fluid level within each well varies. The pump pressure can therefore be significantly higher than the pressure sensed by the pressure sensor. The pump pressure can vary significantly between installations and also within the same installation as the level of the fluid in the well rises or falls.

Pumping systems can be used in developed and developing countries to pump water, often in remote locations. In many applications it is desirable to provide a low cost system that is simple to use and does not require calibration or tuning by the user. Low cost and simple systems are typically more reliable as they have fewer complexities, which further enhances their value. Additionally, it would be desirable to increase standardization to be able to use a motor drive in a plurality of applications instead of increasing working capital to stock multiple variants of motor drives and associated replacement parts.

Improved systems and methods are needed to improve pressure controls under a wide range of pump pressures and applications.

The background to the disclosure is described herein, including reference to documents, acts, materials, devices, articles and the like, to explain the context of the present invention. This is not to be taken as an admission or a suggestion that any of the material referred to was published, known or part of the common general knowledge in the art to which the present invention pertains, in the United States or in any other country, as at the priority date of any of the claims.

SUMMARY

Embodiments of a motor drive and a method of operating the motor drive to control a motor coupled thereto are provided. The motor may be coupled to a rotary fluid displacement machine to circulate a fluid in a fluid system to control a characteristic of the fluid system. The method may comprise determining a proportional error as a limited difference between the pressure and a pressure setpoint; determining an integral error as a limited sum of an integral step and a preceding integral error; determining an error as the sum of the integral error and the proportional error, multiplied by a gain factor; and determining a motor speed based on the error.

The method is implemented in the motor drive. Advantageously, the method is computationally efficient and may permit the use of smaller and less expensive controllers or, alternatively, free processing capacity to perform additional functions. Various stabilization features are provided to further reduce processing and processing costs.

In various embodiments, a motor drive to control a motor in a fluid pumping system is provided, the motor drive comprising: an interface to receive a pressure signal from a pressure sensor indicative of a pressure of a fluid in the fluid pumping system; an inverter; and a controller configured to: determine a proportional error as a limited difference between the pressure and a pressure setpoint; determine an integral error as a limited sum of an integral step and a preceding integral error; determine an error as the sum of the integral error and the proportional error, multiplied by a gain factor; determine a motor speed value based on the error, wherein for each error there is a corresponding motor speed value; and generate control signals to cause the inverter to output a motor voltage based on the motor speed value to drive the motor and maintain the pressure about the pressure setpoint.

In one embodiment, a motor drive comprises: an interface to receive a signal from a sensor, the signal indicating a value of a characteristic of a fluid controlled by operation of the motor; an inverter; and a controller configured to: determine a proportional error as a limited difference between the value of the characteristic and a setpoint of the characteristic; determine an integral error as a limited sum of an integral step and a preceding integral error; determine an error as the sum of the integral error and the proportional error, multiplied by a gain factor; determine a motor speed value based on the error, wherein for each error there is a corresponding motor speed value; and generate control signals to cause the inverter to output a motor voltage based on the motor speed value to drive the motor and maintain the value of the characteristic about the setpoint. Example characteristics include pressure, flow, motor power, motor torque, and motor current.

In another embodiment, a motor drive comprises: an interface to receive a pressure signal from a pressure sensor indicative of a pressure of a fluid; an inverter; and a controller configured to: determine an error based on a difference between the pressure and a pressure setpoint, a proportional error band, and an integral error band; determine a motor speed value based on the error and a relationship between the error and a speed of the motor, wherein for each error there is a corresponding speed value; and generate control signals to cause the inverter to output a motor voltage based on the motor speed value to drive the motor and maintain the pressure about the pressure setpoint.

In a further embodiment, a motor drive to control a motor in a fluid system comprises: an interface to receive a pressure signal from a pressure sensor indicative of a pressure of a fluid in the fluidée pumping system; an inverter; and a controller comprising control logic configured to: determine a proportional error as a limited difference between the pressure and a pressure setpoint; determine an integral error based on an integration time as a limited sum of a preceding integral error and a predetermined value, or as the preceding integral error; determine an error as the sum of the integral error and the proportional error, multiplied by a gain factor; determine a motor speed value based on the error, wherein for each error there is a corresponding motor speed value; and generate control signals to cause the inverter to output a motor voltage based on the motor speed value to drive the motor and maintain the pressure about the pressure setpoint.

In a further embodiment, a method to drive a motor in a fluid pumping system is provided, the method comprising: determining a pressure; determining a proportional error as a limited difference between the pressure and a pressure setpoint; determining an integral error as a limited sum of an integral step and a preceding integral error; determining an error as the sum of the integral error and the proportional error, multiplied by a gain factor; determining a motor speed based on the error, wherein for each error there is a corresponding motor speed; and generating a control signal to cause the inverter to output a motor voltage to drive the motor and maintain the pressure about the pressure setpoint.

DESCRIPTION OF THE DRAWINGS

The features and advantages of the disclosure will become more readily appreciated as the same become better understood by reference to the following detailed description when taken in conjunction with the accompanying drawings, where.

Corresponding reference characters indicate corresponding parts throughout the several views. Although the drawings represent embodiments of various features and components according to the present invention, the drawings are not necessarily to scale and certain features may be exaggerated in order to better illustrate and explain the present invention.

DETAILED DESCRIPTION

For the purpose of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

Except where a contrary intent is expressly stated, terms are used in their singular form for clarity and are intended to include their plural form.

As used herein, the terms "comprises," "comprising," "containing," and "having" and the like denote an open transition meaning that the claim in which the open transition is used is not limited to the elements following the transitional term. The terms "consisting of" or "consists of" denote closed transitions.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

Occurrences of the phrase "in one embodiment," or "in one aspect," herein do not necessarily all refer to the same embodiment or aspect.

Figure 1:
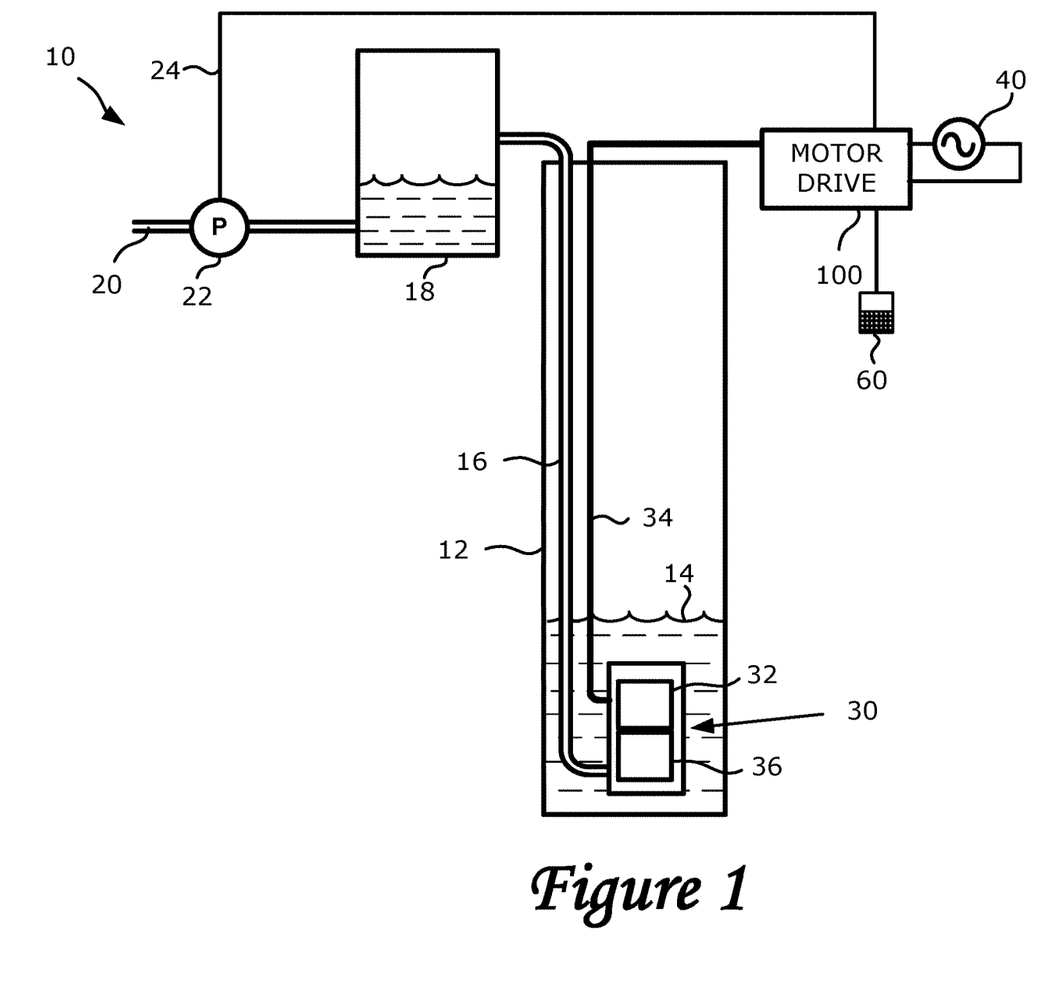
FIG. 1 is a diagrammatic representation of an embodiment of a liquid supply system having a submersible motor.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary The foregoing embodiments of the disclosure, and others, will now be described with reference to the figures. Referring to FIG. 1, a diagrammatic representation of a liquid supply or pump system 10 is disclosed. Example liquids include water, gasoline fuel, diesel fuel, petroleum, oil, sewage, and combinations of such liquids with gases and solids, such as water and coal-based methane gas. The liquid supply system comprises a reservoir 12 containing water 14 which is pumped by a pump unit 30 through a conduit 16, optionally via another reservoir 18, e.g. a pressure tank, to a conduit 20 of a closed system. A submersible or immersive pump unit 30 includes a pump 36 driven by a motor 32 which is powered by a motor drive 100 via power conductors 34. The size of reservoir 12, which is interposed between pump unit 30 and a pressure sensor or transducer 22, affects the response of the system. In one example, the motor drive 100 is a variable frequency drive and pump 36 is a centrifugal pump. Motor drive 100 may be referred to hereinafter as "the VFD". Power conductors 34 may comprise two or more wires to provide single or three phase power to motor 32.

During operation of the system, water 14 flows out of conduit 20. For example, the system may be a water system in a home, in which case water flows out of conduit 20 when a faucet is opened or an irrigation system is turned on. Constant pressure ensures the heads of the irrigation system spray at a constant distance from the head to provide even and predictable irrigation. Fluid characteristics including pressure may be monitored with the pressure sensor 22 disposed in conduit 20 to generate a pressure signal useful to maintain pressure about a setpoint. The pressure signal is provided via line 24 connecting the pressure sensor 22 and the motor drive 100. An exemplary input device 60 is also shown. Input device 60 is provided to receive, from a user, input parameters such as setpoints and schedules. Input device 60 may comprise a smart device wirelessly coupled to motor drive 100. Example smart devices include computers, smart phones and tablets. Reservoir 12 may be an aboveground or underground tank, a well casing, or any other reservoir containing water 14.

Although the embodiments may be described with reference to liquids, particularly water, the invention is not so limited and the principles and advantages thereof may be applicable to any fluid, including liquids, gases, combinations thereof, and fluids containing particulate matter. For example, the embodiments may be applicable to a gaseous system such as a vacuum control system, a fan or a subsystem of a heating, ventilation and air conditioning (HVAC) system. Generally, the embodiments are applicable to any rotary fluid displacement machine driven by a motor with a variable speed drive, including a variable frequency drive. As used herein rotary fluid displacement machines include pumps, fans, ventilators, turbines, radial compressors and other machines having a rotating element provided to displace a fluid.

Figure 2:
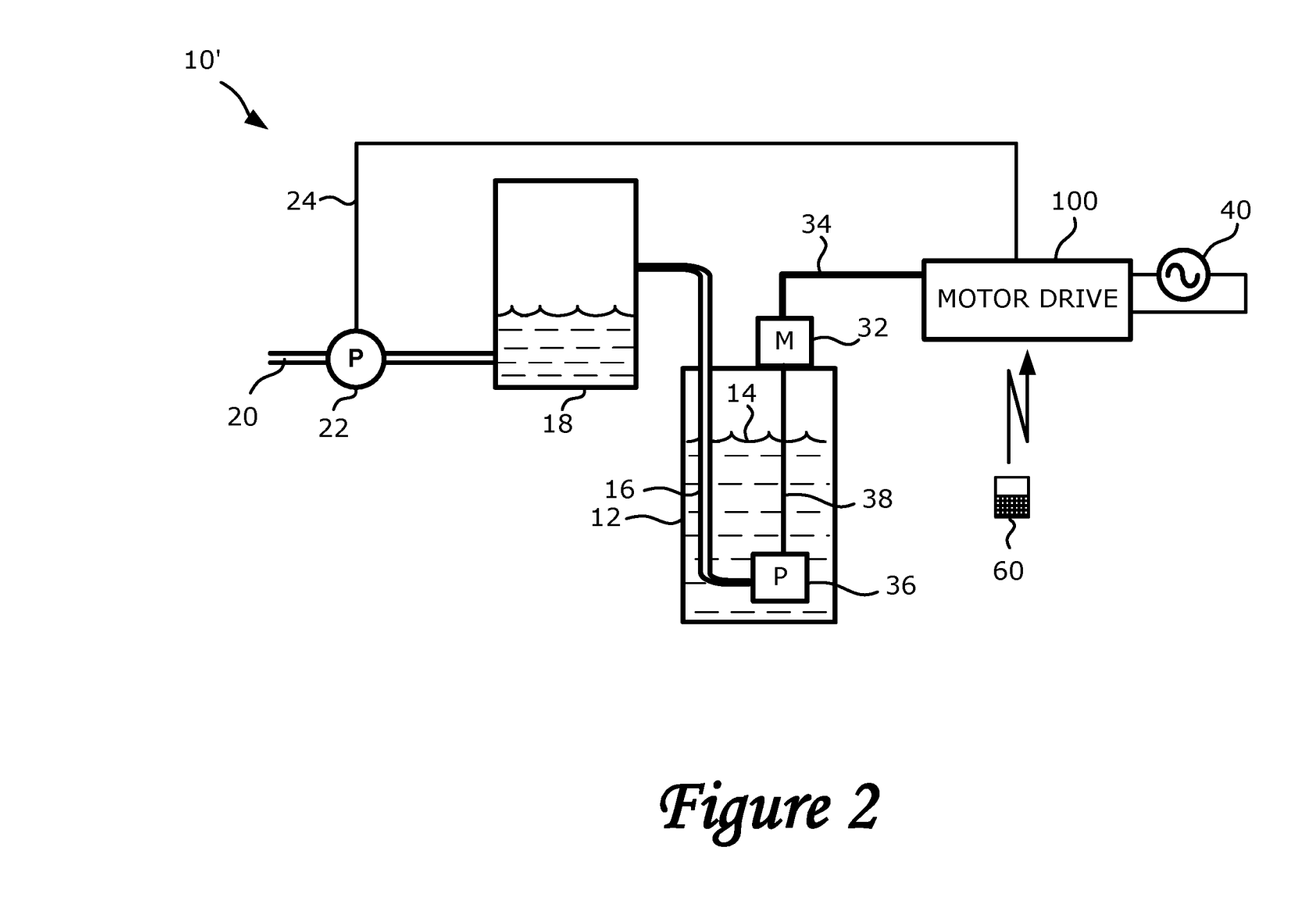
FIG. 2 is a diagrammatic representation of an embodiment of a motor drive liquid supply system having a surface motor.

FIG. 2 illustrates another embodiment of the liquid supply system 10. Unlike in the first embodiment, motor 32 is not submersible and is therefore disposed adjacent the earth's surface. A shaft 38 couples motor 32 and pump 36. In this configuration, pump 36 is powered by shaft 38 under the action of motor 32. Thus, motor drive 100 may be configured to operate both a surface motor and a submersible motor to suit different applications.

Figure 3:
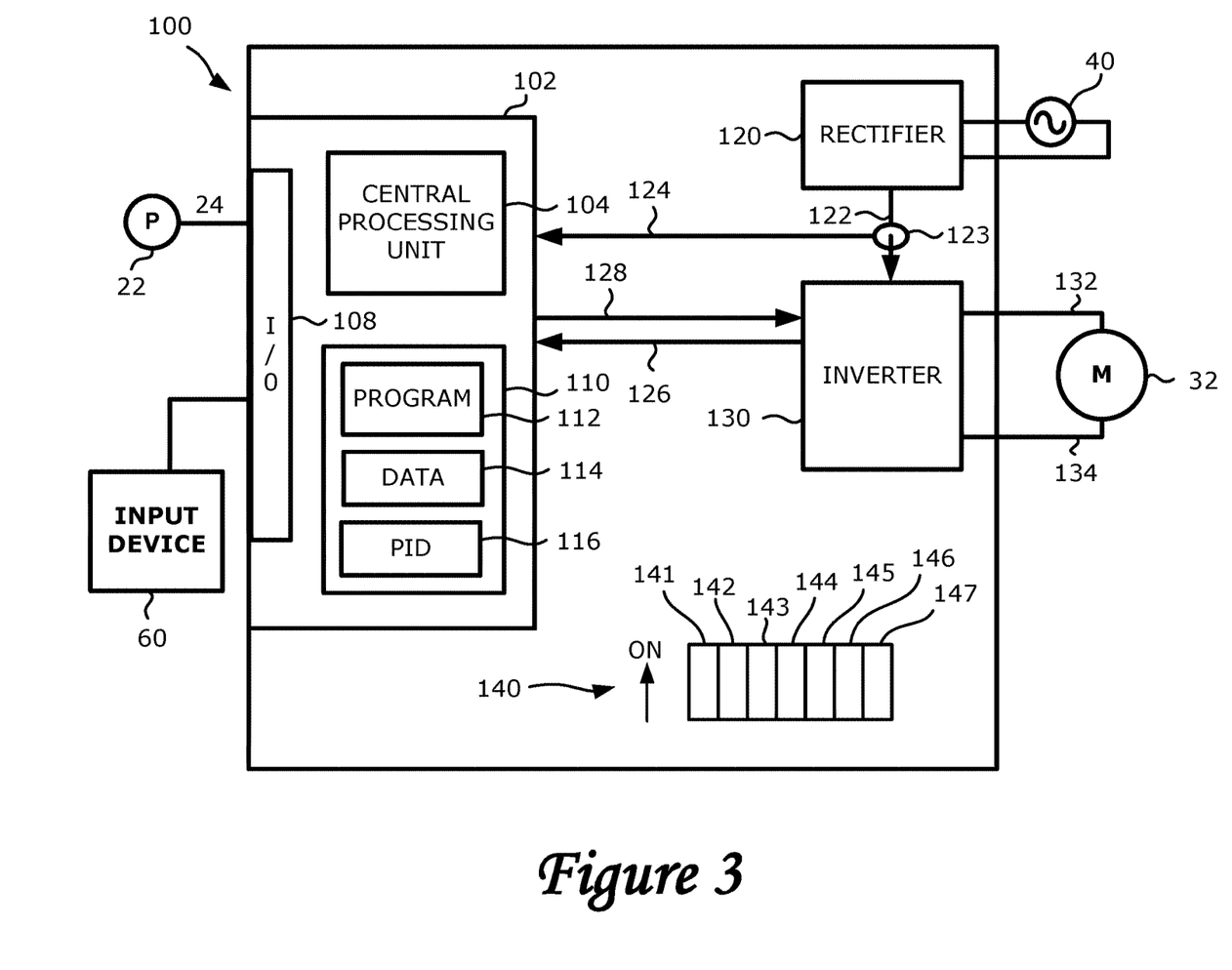
FIG. 3 is a block diagram of an embodiment of a motor drive operable in the liquid supply systems shown in FIGS. 1 and 2

FIG. 3 illustrates an embodiment of motor drive 100 comprising a processing device, illustratively controller 102, a rectifier 120 and an inverter 130. As shown, controller 102 includes a CPU 104 configured to access a memory device 110 and execute processing instructions from a program module, exemplified by program 112, based on data 114. Another example of a program module is shown as PID module 116. PID module 116 is described in additional detail with reference to FIG. 4. PID module 116 may also be comprised in a hardware module communicatively coupled to CPU 102. Motor drive 100 further comprises a plurality of switches, which may be soft or hard switches, operable to configure motor drive 100. Dual-in-line packaged (DIP) switches 140 are shown comprising switches 141-147. Switch 141 is operable to select a surface or submersible mode of operation. The selection of surface or submersible defines the functionality of other switches. Switch 142 is operable to select a minimum speed (e.g. 15 or 30 Hz) in the surface mode. Switches 143-146 are operable in the surface mode to select a level of responsiveness. Example responsiveness levels include slow, medium, fast, and custom. The first three levels are preset and the custom level is programmable. Switch 147 is operable to enable programming of motor drive 100 with input device 60. For example, when switch 147 is ON a user may set custom PID and ramp rate responses (discussed with reference to FIG. 4) and other operating boundaries of motor drive 100, which are not programmable when switch 147 is OFF. In other embodiments, motor drive 100 may be programmed without a programming enable switch, and the responsiveness levels (preset and custom) may be selected via input device 60. Appropriate safeguards may be programmed for safety and security reasons.

Although switch 141 is described in the context of selection of a surface or submersible mode of operation, the concept is equally applicable to any situation where applications require distinction in the functionality of motor drive 100. Thus, a mode switch can distinguish functionality, and PID, response filters, and other functions can be preset according to the application's requirements for the functionality.

Techniques for generating motor voltages according to characteristics of a control signal are known in the art. In one example, a technique comprises storing values in a table corresponding to samples of an operating curve. The operating curve is typically a substantially straight line defining a volts-hertz relationship. When the speed control system determines a desired operating speed, which defines an operating frequency, the motor drive 100 looks up a voltage corresponding to the frequency. The motor drive 100 then generates a motor voltage based on the voltage and the frequency. In another example, a formula or a function embodying the operating curve characteristics is used by CPU 104 to generate the desired motor voltages.

Rectifier 120 is powered by a power source 40 and includes any rectification circuit well known in the art, e.g., a diode bridge, to convert alternating-current (AC) voltage supplied by power source 40 into direct-current (DC) voltage which it supplies to inverter 130. Inverter 130 receives DC power from rectifier 120 through a conductor 122 and converts the DC power into an AC motor power. Power source 40 may comprise a single phase two-wire supply, a single phase three-wire supply, or a three phase supply. A single phase two-wire supply is shown.

CPU 104 receives inputs through an I/O interface 108 and outputs a control signal over line 128 to inverter 130. In one example, the control signal, e.g. speed reference, is provided to a pulse-width-modulated (PWM) module having power switches and control logic which generates the appropriate gating signals for the power switches to convert the DC power supplied by rectifier 120 to the AC motor voltage suitable to drive the motor according to the control signal, provided to the motor via conductors 132, 134. Current drawn by inverter 130 from rectifier 120 is sensed by a current sensor 123 and a current signal is provided by current sensor 123 to CPU 104 by conductor 124. Motor voltage feedback can also be provided, for example through conductor 126 connecting inverter 130 and controller 102. Motor voltages may also be generated with other known or later developed drive topologies programmed in accordance with embodiments of the disclosure.

In a more general embodiment, the controller comprises control logic operable to generate the control signal. The term "logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. A non-transitory machine-readable medium comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein. A non-transitory computer-readable medium, or memory, may include random access memory (RAM), read-only memory (ROM), erasable programmable read-only memory (e.g., EPROM, EEPROM, or Flash memory), or any other tangible medium capable of storing information.

Figure 4:
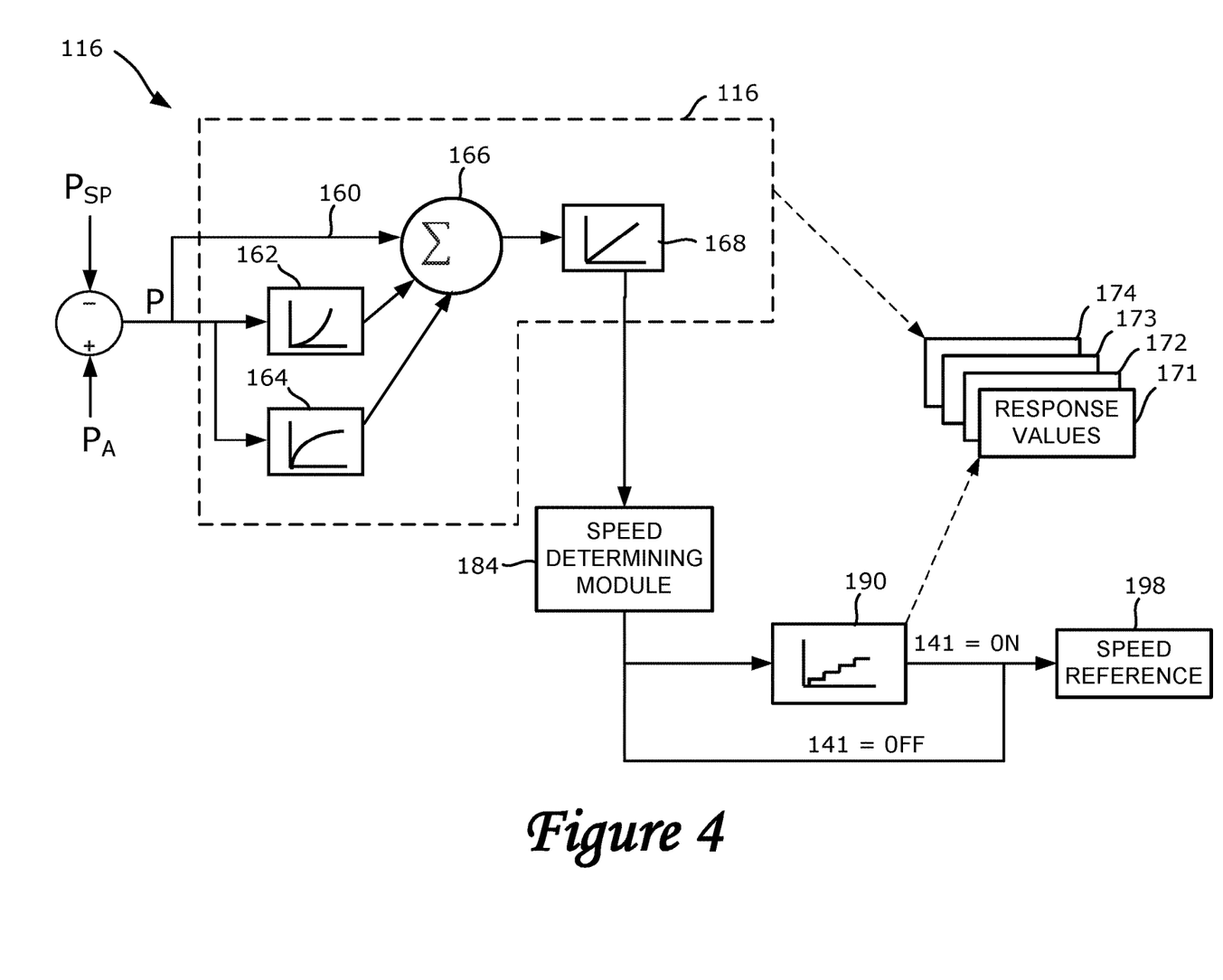
FIG. 4 is a schematic diagram of control logic of the motor drive depicted in FIG. 3.

FIG. 4 is a schematic diagram of an embodiment of control logic of motor drive 100 including PID module 116 and modules configured to implement functions described in more detail with reference to FIGS. 5 to 9. PID module 116 receives an error signal "P" equal to the difference between the actual and setpoint pressures $P_A$ and $P_{SP}$. The error signal is provided to a derivative gain module 162, an integral gain module 164, and a summing module 166 which also receives the outputs of derivative gain module 162 and integral gain module 164. Summing module 166 outputs the sum to a proportional gain module 168 and its output, which is the output of PID module 116, is provided to the proportional gain module 168 as described with reference to FIGS. 5 and 6. Any known configuration of modules to provide PID control is also suitable. However, embodiments of the derivative gain module 162 and integral gain module 164 described below are computationally inexpensive and easily configurable, thus a VFD implementing derivative gain module 162 and integral gain module 164 may require a smaller controller that may generate less heat and may be less expensive. The output of gain module 168 is provided to a speed determining module 184 where a speed signal is determined. Depending on whether motor drive 100 is set to surface or submersible mode, the output of speed determining module 184 is ramped by a ramp rate module 190 (e.g. switch 141 is ON) to output a speed reference 198 or is not ramped (e.g. switch 141 is OFF) and is used as the speed reference 198. Ramping the speed signal to speed reference 198 comprises implementing the required increase or decrease in speed from the present speed in a predetermined time determinable based on the ramp rate. Thus if the ramp rate is 2 Hz/sec, a speed increase of 10 Hz will occur linearly over 5 seconds. Of course the schematic depiction of this binary option can be implemented by proper selection of parameters for ramp rate module 190. The functionality of limit module 180 and speed determining module 184 are described below with reference to FIGS. 5 and 6.

As described above, motor drive 100 may be configured with a plurality of responsiveness levels. Sets of response values to configure ramp rate module 190 and PID module 116 are stored in memory 110 (subsets of data 114) and selectable by the user to set a desired level of responsiveness from motor drive 100. For example, response values 171, 172, 173, and 174 comprise parameters to achieve slow, medium, fast and custom response. These values include a ramp rate value (e.g. Hz/sec) and derivative, integral, and proportional gain values. In one variation of the present embodiment, a response is preset in the submersible mode and various response levels and ramp rates are selectable in the surface mode. This limitation is desirable because surface systems may involve a large variety of pump and motor types and sizes, and also significant variation in head due to the depth at which the motors may be placed, therefore flexibility may be more desirable because the pump systems may operate at the periphery of the pump curve, where small changes in the speed reference can generate larger responses from the pump and vice versa. In submersible systems, it may be preferable to limit complexity by providing users a drive that does not require selection of responsiveness. It should be understood that while the selection of responsiveness and use of a ramp rate has been described with reference to liquid pumping applications, the functionality of the responsiveness selection feature and the ramp feature are optional and may be included with any VFD based on the system and application requirements, including the desirability of broader flexibility or the desirability of a system that is simpler to install and setup.

Figure 5:
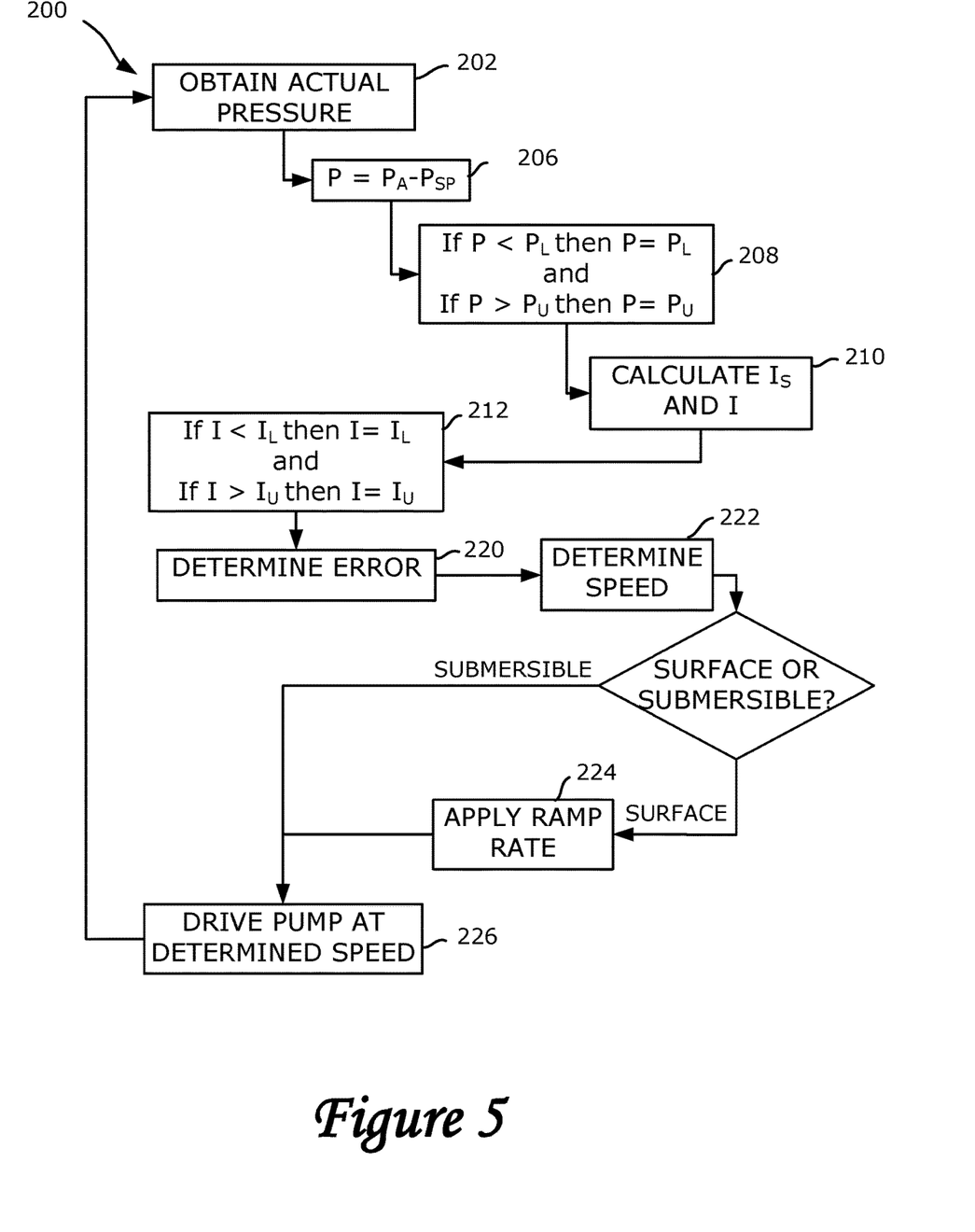
FIG. 5 is a flowchart depicting an embodiment of a method for adaptively controlling the speed of a pump.
Figure 6:
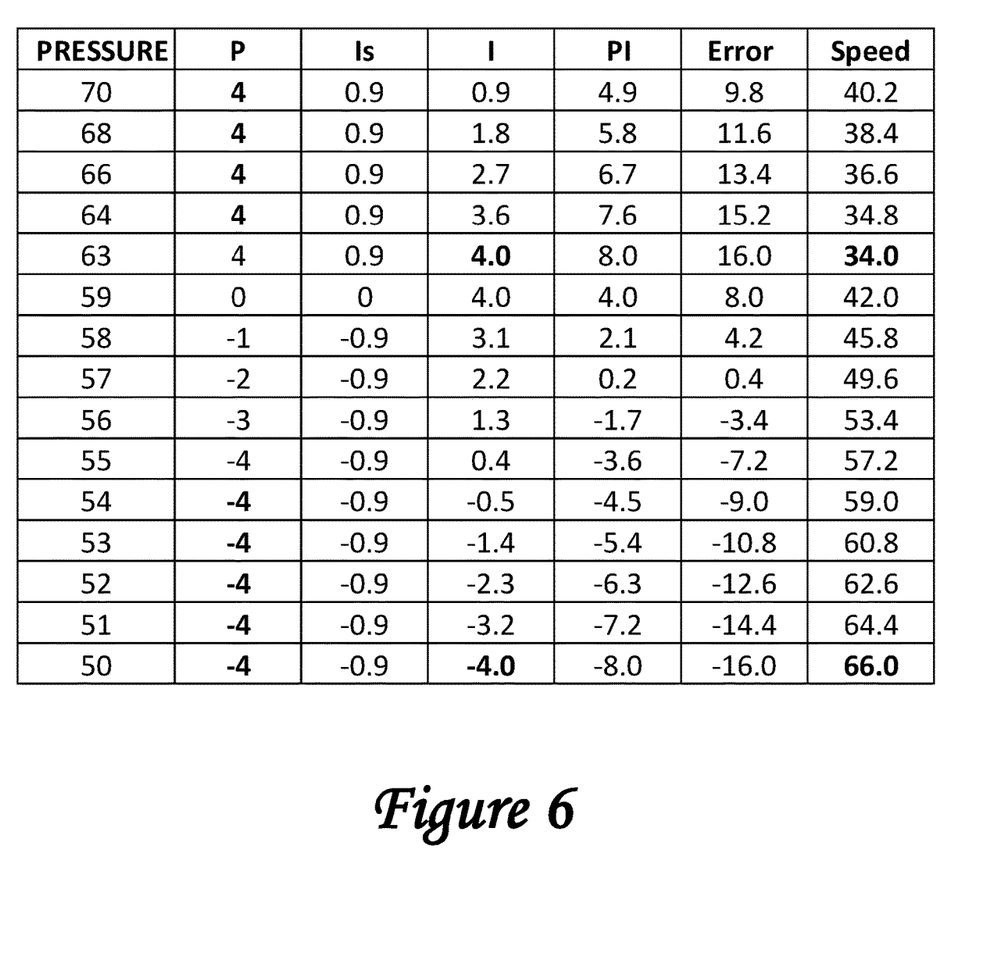
FIG. 6 is a table provided to illustrate the control logic embodied in the method referred to in FIG. 5.

Referring now to FIG. 5, a flowchart 200 is provided to depict an embodiment of a method to adaptively control the speed of the pump to a setpoint pressure. The method can be implemented with a motor drive such as motor drive 100 described with reference to FIGS. 3 and 4. According to the method, the speed of the motor is based on an error determined based on a proportional and an integral error. Values of the variables described below are shown in a table depicted in FIG. 6, which will be referenced to better illustrate the method. All references herein to the table refer to the table shown in FIG. 6. It should be understood that while FIG. 6 is provided to illustrate an embodiment described herein with reference to pressure, the method is equally applicable to control a motor based on any characteristic of the fluid or the fluid system, including flow, motor power, motor torque, motor speed, motor current, or any other parameter whether obtainable by measuring, modeling, or otherwise determining an actual value utilizing sensors external of the VFD or within the VFD. The values of $P_A$ shown in the table are not a result of use of the method with a particular system and were selected to illustrate the points discussed below.

The method begins at 202 when the controller obtains a pressure $P_A$, which is the actual pressure of the liquid in system 10. The pressure is derived, modeled, determined, or obtained from a signal of a pressure sensor.

The following aspects of the method are performed by an embodiment of a derivative gain module 162. At 206, the controller sets P equal to the difference between the actual and setpoint pressures. At 208, the controller determines if the difference is within a proportional error band defined by upper and lower limits $P_U$ and $P_L$ and applies a limit if the difference is outside the band by assigning to P the value of $P_U$ if the difference exceeded $P_U$ and the value of $P_L$ if the difference was less than $P_L$. In this manner the controller limits P to the proportional error band, and P may thus be referred to as a limited difference between the pressure and a pressure setpoint. In the column titled "P" boldfaced values indicate that a limit has been applied to the difference. In the present example, $P_L$ and $P_U$ are set to −4.0 and 4.0, respectively.

The following aspects of the method are performed by an embodiment of an integral gain module 164. At 210, the controller determines an integral step $I_S$ and an integral error I. $I_S$ the smaller of P and an incremental step limit $I_{SL}$ (which has the same sign as the difference). In the present example, $I_{SL}$ is set to 0.9 to more effectively illustrate the resulting changes to I. Therefore, when the absolute value of the difference exceeds 0.9, $I_{SL}$ is set to either −0.9 or 0.9. The integral error I is calculated each cycle, which may be every 100 milliseconds. An integration time $I_T$ may be used to weigh the effect of integration. The integration time in this example equals one, meaning that the controller determines the integral step $I_s$ and adds $I_s$ to the immediately preceding integral error I every cycle to determine the new value of I. In other words, $I_c = I_s + I_{c-1}$, where the subscript C denotes the cycle. As described below, different values of the variables described in the present embodiment can be implemented to make the results more or less sensitive to deviations by an actual value of the control parameter from the setpoint.

At 212, the controller determines if I is within an integral error band defined by upper and lower limits $I_U$ and $I_L$ and assigns I the value of $I_U$ if I exceeded $I_U$ and the value of $I_L$ if I was less than $I_L$. In this manner the controller limits I to the integral error band. After application of the limits I may be referred to as a limited sum of the integral step and a preceding integral error. In the column titled "I" boldfaced values indicate that a limit has been applied. In the present example, $I_L$ and $I_U$ are set to −4.0 and 4.0, respectively. The limits of P and I do not need to be the same. The upper limits need not have the same absolute value as the lower limits.

At 220 a summing module 166 adds P and I. The sum of the upper limit of P and the upper limit of I defines the maximum value of PI, in this case 8.0 and also the error that sets the minimum speed of the motor drive based on the present embodiment. The sum of the lower limit of P and the lower limit of I defines the minimum value of PI, in this case −8.0 and also the error that sets the maximum speed of the motor drive based on the present embodiment.

Subsequently a gain module 168 multiplies PI by a gain factor G to determine the error. In the present example, G is set to 2. The gain factor G is selected to define the range of the error determinable in accordance with the present embodiment. Below the minimum speed and the maximum speed determinable in accordance with the present embodiment, the speed may be further increased or decreased in accordance with the operational limits of the motor and the pump in any desired manner.

At 222 a speed determining module 184 determines a preliminary speed with a speed versus error function. In the present example the speed versus error function comprises subtraction of the error from a constant, e.g. 50, resulting in a minimum speed of 34 Hertz and a maximum speed of 66 Hertz. Any speed versus error function may be applied instead to instill curvature near the minimum and maximum error values, for example, or to provide a convex or concave shape. The speed versus error function may be mapped to the error in a table. The speed versus error function may also be provided in a formula based on the error.

Figure 7:
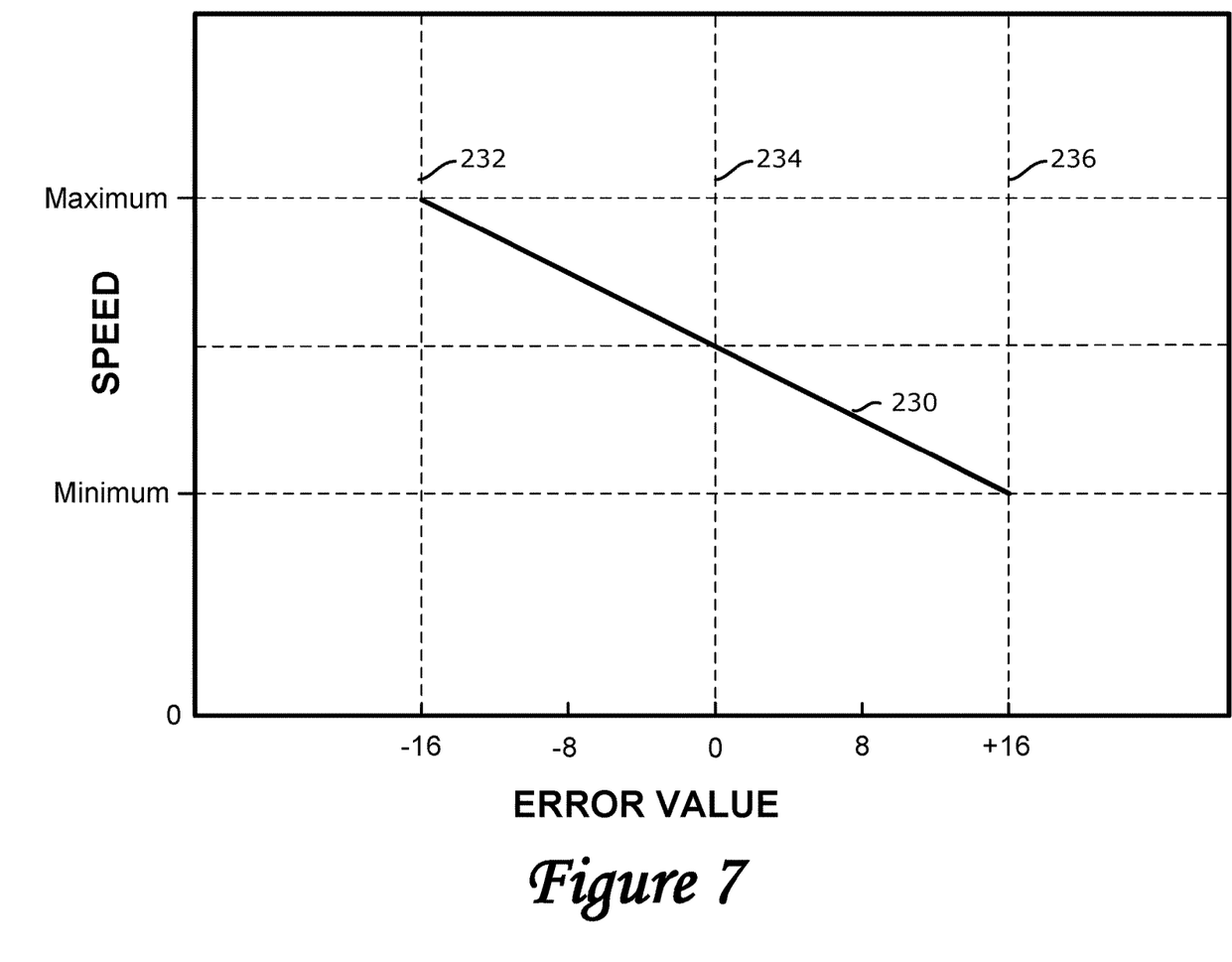
FIG. 7 is a graph depicting speed as a function of an error value determined in accordance with the embodiment of the method referred to in FIG. 5.

FIG. 7 depicts graphically the embodiment described above, illustrated by a line 230. Dashed vertical lines 232, 234, 236 illustrate the minimum, middle, and maximum speeds determinable in accordance with the present embodiment. As the error increases, meaning that pressure is higher than the setpoint, the speed of the motor decreases along line 230 until it reaches the minimum speed determinable in accordance with the present embodiment at line 236. As the error decreases, meaning that pressure is lower than the setpoint, the speed of the motor increases until it reaches the maximum speed determinable in accordance with the present embodiment at line 232. The speed versus error function can be stored in a table or the control logic in the motor drive can calculate the speed once the error value has been determined in accordance with the teachings herein. The speed versus error function can be stored in a table or the control logic in the motor drive can calculate the speed once the error value has been determined in accordance with the teachings herein. Advantageously, using error bands to limit the effect of the difference between. Advantageously, using error bands to limit the effect of the difference between the actual and setpoint pressures results in a system that is computationally inexpensive yet effective. The limits, gain and error function in the present embodiment were selected for exemplification of the table. Other conditions may be chosen based on the design of the fluid supply system.

If the VFD is set for submersible operation, the speed is the speed reference. If the VFD is set for surface operation, then at 224 a ramp rate is applied to generate the speed reference. At 226 the speed reference is used by the PWM module in the VFD to generate the power switch switching signals that generate the motor voltage to drive the pump at the determined speed, e.g. the speed reference.

In the embodiment depicted with reference to FIGS. 5 to 7, PI values which may be changed to change responsiveness include the upper and lower proportional limits $P_U$ and $P_L$, the upper and lower integral limits $I_U$ and $I_L$, the incremental step limit $I_{SL}$, the integration time $I_T$, the proportional gain factor G, and the shape of the error function.

In another variation of the present embodiment, multiple speed versus error functions are included in the motor drive and selected using a user interface of the smart device based on the application or to tailor the motor drive to a fluid system installation.

In a variation of the present embodiment, a different integration time is applied by the control logic to reduce the effect of the integral error. The method described with reference to FIG. 5 has an integration time $I_T$ equal to one, meaning that the controller determines the integral step $I_s$, and adds $I_s$, to the immediately preceding integral error I each time it calculates the error, i.e. every cycle. When the integration time $I_T$ is greater than one, the integral error I is not incremented by $I_s$, each cycle. If $I_T=5$, for example, the integral error I will be incremented every $5^{th}$ cycle. The same effect is achieved by incrementing the immediately preceding integral error by $I_s$, each cycle but setting $I_s=0$ for all the cycles except every $5^{th}$ cycle.

Figure 8:
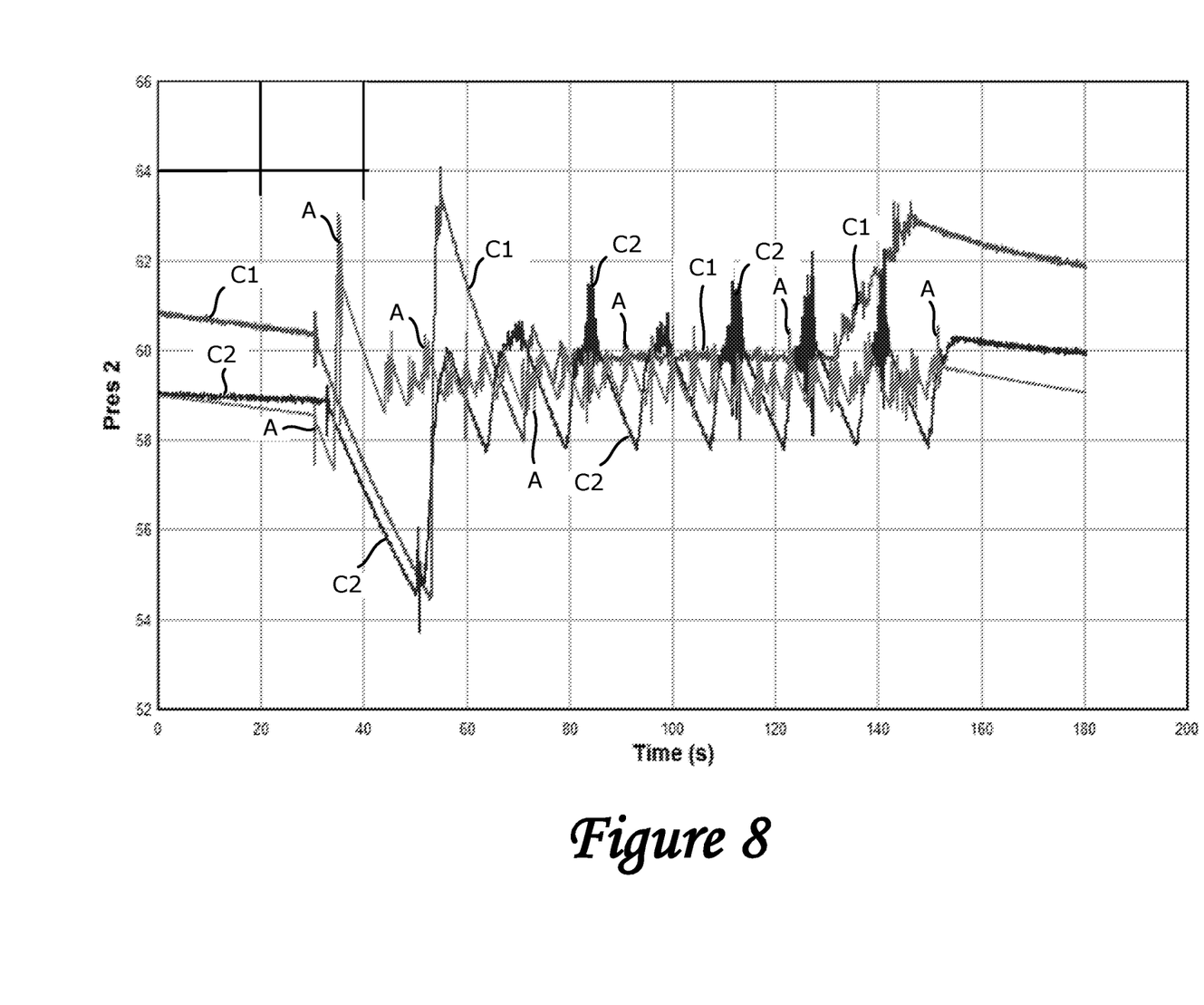
FIG. 8 is a comparative graph depicting the performance of a system implementing the embodiment of the method referred to in FIG. 5 and the performance of existing systems.

The foregoing method advantageously provides a control algorithm that is stable regardless of the pump pressure (or well head) and is computationally inexpensive. Referring now to FIG. 8, a comparative graph depicting the performance of a system implementing the embodiment of the method referred to in FIG. 5, exemplified by line A, and the performance of existing systems, exemplified by lines C1 and C2, is provided. The performance curves were obtained by connecting motor drives, at different times, to a pilot fluid system including a pump in a well and a closed system including a valve configured to produce flow at a rate of 1 gallon per minute (GPM). During about the initial 30 seconds, the motor drives were idle, the pilot system was pressurized, and the valve remained closed. Then the valve was opened and the motor drives begun to drive the pump to maintain the setpoint, which they accomplished with different degrees of success. At about 130 seconds the valve was closed. In the present example $I_T$ was set to 5 and $I_{SL}$ was set to 0.2. The cycle time was set to 0.1 seconds, therefore I was updated every 0.5 seconds and remained unchanged between updates.

Referring to line A, it can be seen that during the initial period the pressure drops slightly from the 59 PSI setpoint. This is due to leakage. When pumping starts, pressure does not fall below 57.5 PSI, in contrast with lines C1 and C2 illustrating that the existing drives undershot to about 55 PSI. Undershooting is not desirable. Line A then overshoots to about 63 PSI for no more than a few seconds and then settles between 58-60 PSI beginning at about 40 seconds (10 seconds after the valve was opened). By contrast, line C1 overshoots to 64 PSI and begins to settle at 80 seconds (70 seconds after the valve was opened). Line C2 does not overshoot but settles after about 22 seconds and controls within a 4 PSI range. So C2 shows a slow response, C1 shows very tight control once it settles but it takes a long time to settle and undershoots and overshoots significantly. Line A, resulting from the novel method described above, responds quickly and well.

In various embodiments additional stabilization features are incorporated. In one embodiment, the pressure is stabilized even further by decreasing the cycle time and making the integral step independent of pressure variations. Thus, at 210, the control logic applies a predetermined integral step I. In one example, the absolute value of $I_S$ is set to 0.01, therefore when the difference is positive $I_S$=+0.01, and when the difference is negative $I_S$=−0.01. The cycle time may be decreased, for example, from 100 milliseconds to 10 milliseconds. Therefore the frequency of the speed adjustments is increased 10× while the amount of each adjustment is limited to a smaller value. It should be understood that the cycle time may be varied based on other design considerations such as the processing speed of the controller, the size of the program, and other factors, and the predetermined integral step may be set based on the cycle time and other factors to achieve a desired control strategy.

In another embodiment of a control method, pressure is stabilized by the controller entering a pause mode. The method will now be described with reference to a flowchart 300 depicted in FIG. 9. The method begins by defining, at 302, a control band. The control band may comprise the pressure difference between an upper control limit UCL and a lower control limit LCL.

Figure 9:
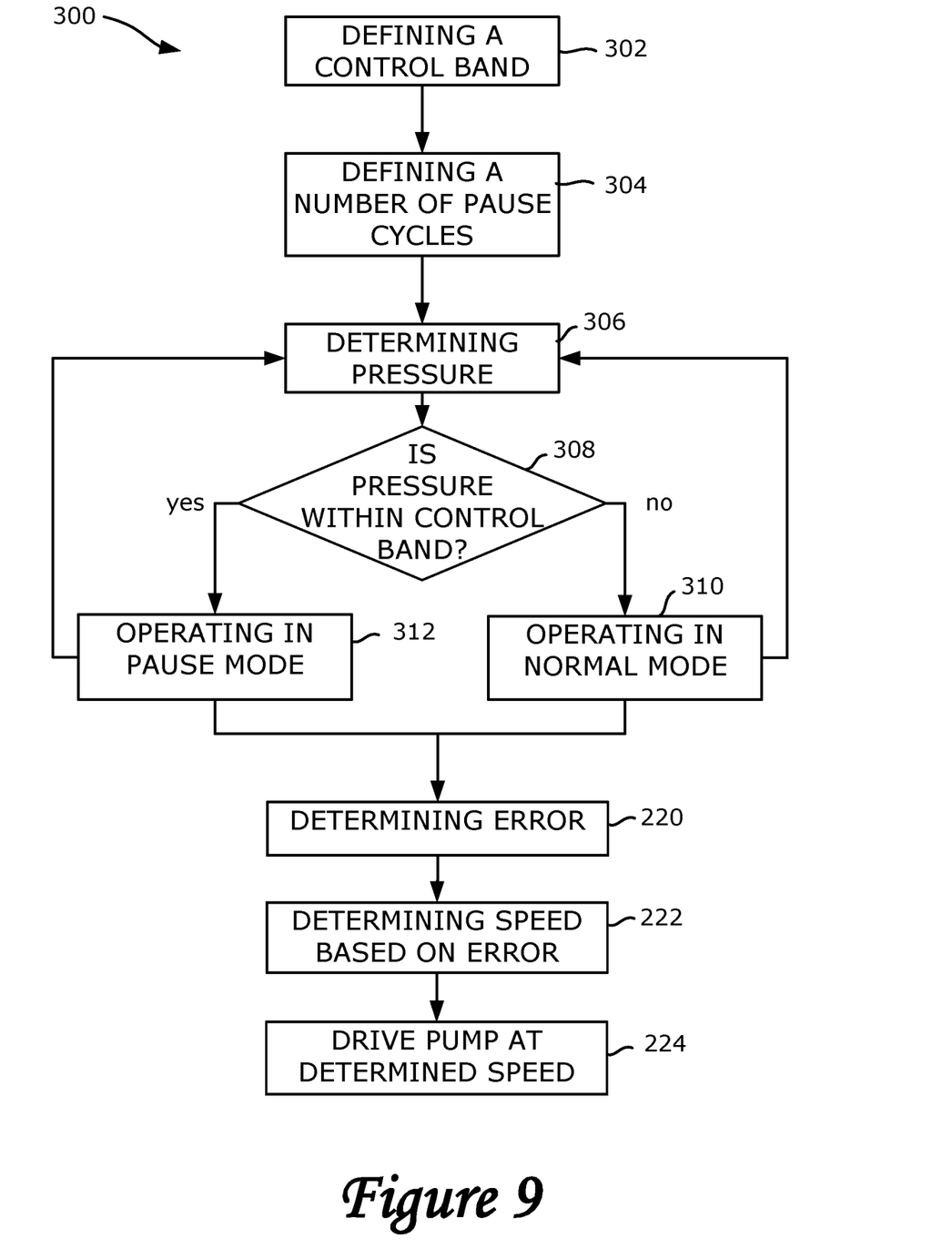
FIG. 9 is a flowchart depicting an embodiment of a method for adaptively controlling the speed of a pump.

The method continues by defining, at 304, a number of pause cycles. In one example, the number of pause cycles is predetermined as 50 pause cycles. The number of pause cycles can be defined based on the duration of the cycle and the desired stability.

The method continues by determining, at 306, pressure. Pressure may be the actual pressure or another parameter based on the actual pressure. Such parameter would correspond to the UCL and LCL.

The method continues by determining, at 308, if pressure is within the control band. If pressure is outside the control band, at 310 the controller continues operating as described above, which may be referred to as a normal mode of control.

If pressure is within the control band, the controller transitions to or continues operating in a pause mode of control. By contrast with the normal mode, in the pause mode incrementation of the integral error I is paused for a predetermined number of pause cycles. The concept is analogous to the integration time, where the integration time determines how frequently the integral error I is incremented by $I_s$, e.g. every 5$^{th}$ cycle or 50 milliseconds. In one example the predetermined number of pause cycles is 10× the integration time, e.g. 50 cycles or 500 milliseconds. Alternatively, the integral error can be incremented but $I_s$ is set to 0 in the pause mode to achieve the same result, maintaining the integral error constant.

The control band may be set as $P_{SP}$+/−0.5 PSI. Of course the control band does not need to be centered on the pressure setpoint, the control band may be offset, for example, $P_{SP}$+0.4/−0.6 PSI, or can be set in any desired manner.

The method continues at 220-224 by determining the error, determining the speed based on the error, and driving the pump at the determined speed. The error determination is based on the integral error determined in accordance with the normal mode or the pause mode as described.

Referring again to 310, if while in the pause mode the pressure exceeds the UCL or falls below the LCL, then the controller exits the pause mode. The controller transitions from the pause mode to the normal mode of control depending on how many cycles have passed since the controller entered the pause mode. If the number of cycles is less than the integration time, the controller transitions to the normal mode with the cycles being counted for the integration time. Thus, if the integration time is 5 cycles, and 3 cycles passed since entering the pause mode, then the controller will increment I by $I_s$, after 2 additional cycles, so that the pause cycles plus the additional cycles equal the integration time. In this manner transitioning from pause mode does not result in incrementation of the integral error at a rate faster than the rate determined by the integration time.

On the other hand, if the paused cycles are greater than the integration time, the controller increments I by $I_s$ immediately, and thereafter continues to increment I based on the integration time, until the controller transitions to the pause mode again if the pressure falls into the control band.

After the predetermined number of pause cycles, the controller increments I by $I_s$ and remains in the pause mode so long as the pressure remains within the control band.

Figure 10:
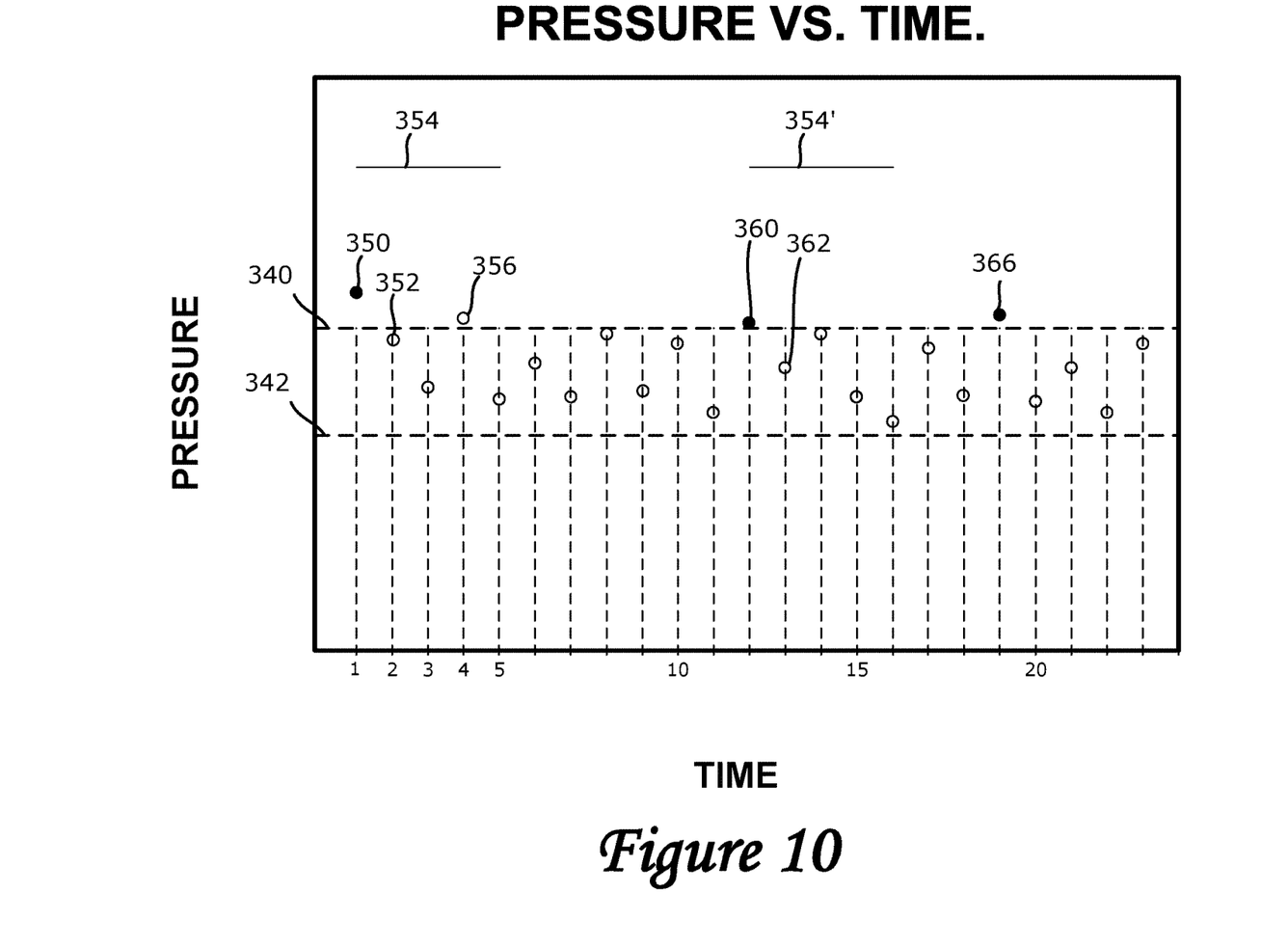
FIG. 10 is a graph depicting pressure vs. time to illustrate an implementation of the method depicted with reference to FIG. 8.

FIG. 10 is a graph illustrating aspects of the present embodiment. In FIG. 10, time is shown in cycles, which correspond to the amount of time between potential speed adjustments. The UCL and the LCL correspond to lines 340 and 342. Filled circles represent pressures which trigger incrementation of the integral error and unfilled circles represent pressures which do not trigger incrementation of the integral error. In this example, pressure 350 triggers incrementation. Pressure 352 does not trigger incrementation because it is within the control band and also because it is within the integration time (e.g. 2$^{nd}$ of 5 cycles), represented by lines 354, 354'. Pressure 356 does not trigger incrementation because it is within the integration time (e.g. 4$^{nd}$ of 5 cycles), even though it is outside the control band. Pressure 360 triggers incrementation because it is outside the control band and is more than 5 cycles after the last incrementation.

Pressure 362 does not trigger incrementation because it is within the control band and also because it is within the integration time (e.g. 2$^{nd}$ of 5 cycles). Pressure 366 triggers incrementation because it is outside the control band and is more than 5 cycles after the last incrementation (e.g. pressure 360).

The principles of the foregoing embodiment can be implemented in different ways. For example the control band may correspond to any representation of actual pressure. In one example, the representation comprises the difference between actual and setpoint pressures, such that speed adjustments are paused if a difference falls outside a suitably scaled control band.

It should be understood that the embodiments, variations, and examples described above may be combined in any suitable manner. Therefore the control logic may be configured to refine the stability of the control based on, for example, hardware capability and cost, and the requirements of the fluid supply system.

Unless otherwise expressly stated in connection with a specific use thereof, the term "device" includes a single device, a plurality of devices, two components integrated into a device, and any variations thereof. The singular form is only used to illustrate a particular functionality and not to limit the disclosure to a single component. Therefore, the term "memory device" includes any variation of electronic circuits in which processing instructions executable by a processing device may be embedded unless otherwise expressly stated in connection with the specific use of the term. For example, a memory device includes read only memory, random access memory, a field programmable gate array, a hard-drive, a disk, flash memory, and any combinations thereof, whether physically or electronically coupled. Similarly, a controller includes, for example, a central processing unit, a math processing unit, a plurality of processors on a common integrated circuit, and a plurality of processors operating in concert, whether physically or electronically coupled. Furthermore and in a similar manner, the term "application" includes a single application, a plurality of applications, one or more programs or subroutines, software, firmware, and any variations thereof suitable to execute instruction sequences with a processing device.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A motor drive to control a motor in a fluid system, the motor drive comprising:
    an interface to receive a pressure signal from a pressure sensor indicative of a pressure of a fluid in the fluid system;
    an inverter; and
    a controller configured to:
        determine a proportional error as a limited difference between the pressure and a pressure setpoint, wherein the limited difference denotes that the proportional error is limited to be within a proportional error band;
        determine an integral error as a limited sum of an integral step and a preceding integral error;
        determine an error as a sum of the integral error and the proportional error, multiplied by a gain factor;
        determine a motor speed value based on the error, wherein for each error there is a corresponding motor speed value; and
        generate control signals to cause the inverter to output a motor voltage based on the motor speed value to drive the motor and maintain the pressure about the pressure setpoint.

2. The motor drive of claim 1, wherein the limited difference comprises (a) a lower proportional limit if a difference between the pressure and the pressure setpoint is less than the lower proportional limit, (b) an upper proportional limit if the difference is greater than the upper proportional limit, and (c) the difference otherwise.

3. The motor drive of claim 2, wherein the integral step comprises a difference between the pressure and the pressure setpoint if an absolute value of the difference is less than an integral step limit, and comprises the integral step limit with a sign of the proportional error otherwise.

4. The motor drive of claim 3, wherein the controller determines the motor speed value in successive cycles, and wherein the controller is configured to periodically determine, in accordance with an integration time, the integral step, and wherein the controller is configured to periodically determine the integral step as the immediately preceding integral step.

5. The motor drive of claim 1, wherein the controller determines the motor speed in successive cycles, and wherein the controller is configured to periodically determine, in accordance with an integration time, the integral error as the preceding integral error.

6. The motor drive of claim 1, wherein the limited sum comprises (a) a lower integral limit if the sum of the integral step and the preceding integral error is less than the lower integral limit, (b) an upper integral limit if the sum is greater than the upper integral limit, and (c) the sum otherwise.

7. The motor drive of claim 1, wherein the controller enters a pause mode when a value of a parameter based on the pressure is within a control band, and wherein in the pause mode the controller determines the integral error as the preceding integral error for a predetermined number of cycles.

8. A motor drive to control a motor in a fluid system, the motor drive comprising:
    an interface to receive a pressure signal from a pressure sensor indicative of a pressure of a fluid in the fluid system;
    an inverter; and
    a controller comprising control logic configured to:
        determine a proportional error as a limited difference between the pressure and a pressure setpoint, wherein the limited difference denotes that the proportional error is limited to be within a proportional error band;
        determine an integral error based on an integration time as a limited sum of a preceding integral error and a predetermined value, or as the preceding integral error;
        determine an error as a sum of the integral error and the proportional error, multiplied by a gain factor;
        determine a motor speed value based on the error, wherein for each error there is a corresponding motor speed value; and
        generate control signals to cause the inverter to output a motor voltage based on the motor speed value to drive the motor and maintain the pressure about the pressure setpoint.

9. The motor drive of claim 8, wherein the control logic comprises a ramp rate module structured to modify the motor speed value in accordance with a ramp rate to generate a speed reference, and wherein the control logic is configured to generate the control signals with the speed reference to cause the inverter to output the motor voltage.

10. The motor drive of claim 8, further comprising an configuration selection switch having a first position corresponding to a first configuration and a second position corresponding to a second configuration, and further comprising a plurality of configuration switches, wherein in the first position of the configuration selection switch the plurality of configuration switches modify a first plurality of parameters and in the second position of the configuration selection switch the plurality of configuration switches modify a second plurality of parameters different than the first plurality of parameters.

11. The motor drive of claim 10, further comprising a plurality of sets of response values, wherein the control logic is configured to select a set of response values from the plurality of response values to change a responsiveness of the control logic, whereby the responsiveness of the control logic affects how a change in pressure changes the motor voltage.

12. The motor drive of claim 11, wherein the plurality of sets of response values include a set of slow response values, a set of medium response values, and a set of fast response values.

13. The motor drive of claim 12, wherein the plurality of sets of response values also include a set of custom response values which are configurable by a user, wherein the set of slow response values, the set of medium response values, and the set of fast response values are not configurable by the user.

14. The motor drive of claim 11, wherein when the configuration selection switch is in the first position, a user can select the set of response values from the plurality of response values to change the responsiveness of the control logic and when the configuration selection switch is in the second position the user cannot select the set of response values.

15. The motor drive of claim 14, wherein the user can select the set of response values with the plurality of configuration switches.

16. The motor drive of claim 15, wherein the plurality of configuration switches include slow, medium, fast, and custom response switches.

17. A method to drive a motor in a fluid system, the method comprising:
   determining a pressure;
   determining a proportional error as a limited difference between the pressure and a pressure setpoint, wherein the limited difference denotes that the proportional error is limited to be within a proportional error band;
   determining an integral error as a limited sum of an integral step and a preceding integral error;
   determining an error as a sum of the integral error and the proportional error, multiplied by a gain factor;
   determining a motor speed based on the error, wherein for each error there is a corresponding motor speed; and
   generating a control signal to cause the inverter to output a motor voltage based on the motor speed to drive the motor and maintain the pressure about the pressure setpoint.

18. The method of claim 17, wherein the limited difference comprises (a) a lower proportional limit if a difference between the pressure and the pressure setpoint is less than the lower proportional limit, (b) an upper proportional limit if the difference is greater than the upper proportional limit, and (c) the difference otherwise.

19. The method of claim 17, wherein the integral step comprises a difference between the pressure and the pressure setpoint if an absolute value of the difference is less than an integral step limit, and comprises the integral step limit with a sign of the proportional error otherwise.

20. The method of claim 19, further comprising determining the motor speed in successive cycles, periodically determining the integral step in accordance with an integration time (a) as a difference between the pressure and the pressure setpoint if the absolute value of the difference is less than an integral step limit and the integral step limit with the sign of the proportional error otherwise, or (b) as the preceding integral step.

* * * * *